UNITED STATES PATENT OFFICE.

B. H. BENER AND M. H. BURGESS, OF ERIE, PENNSYLVANIA.

IMPROVED MEDICATED CANDY.

Specification forming part of Letters Patent No. 48,645, dated July 11, 1865.

*To all whom it may concern:*

Be it known that we, B. H. BENER and M. H. BURGESS, of Erie, in the county of Erie and State of Pennsylvania, have invented a new and useful Improvement in Medical Compounds; and we do hereby declare that the following is a full, clear, and exact description of the same.

Our medical composition is prepared in the following manner: We take equal quantities of Iceland moss, slippery elm, horehound, and boil them together in water until a combined medicated decoction or liquid composed of the above substances is obtained. We then strain the medicated liquor, and to it we add sugar, either white or brown, or molasses or sirup, in such proportion that the whole mass may be converted into candy by the usual process of cooking sugar or molasses into candy.

The candy thus formed constitutes our improved medical compound.

The proportion of medicated liquor which we mix with the sugar or molasses may be varied at pleasure, so as to form a medicated compound or candy of greater or less medicated strength, but composed of the above ingredients.

We claim as new and desire to secure by Letters Patent—

The medical compound made as herein described.

M. H. BURGESS.
B. H. BENER.

Witnesses:
H. JONES, Jr.,
W. H. SEWELL.